W. V. TURNER.
DUPLEX PRESSURE CONTROL APPARATUS.
APPLICATION FILED MAY 28, 1907.
1,015,855.
Patented Jan. 30, 1912.
2 SHEETS—SHEET 2.
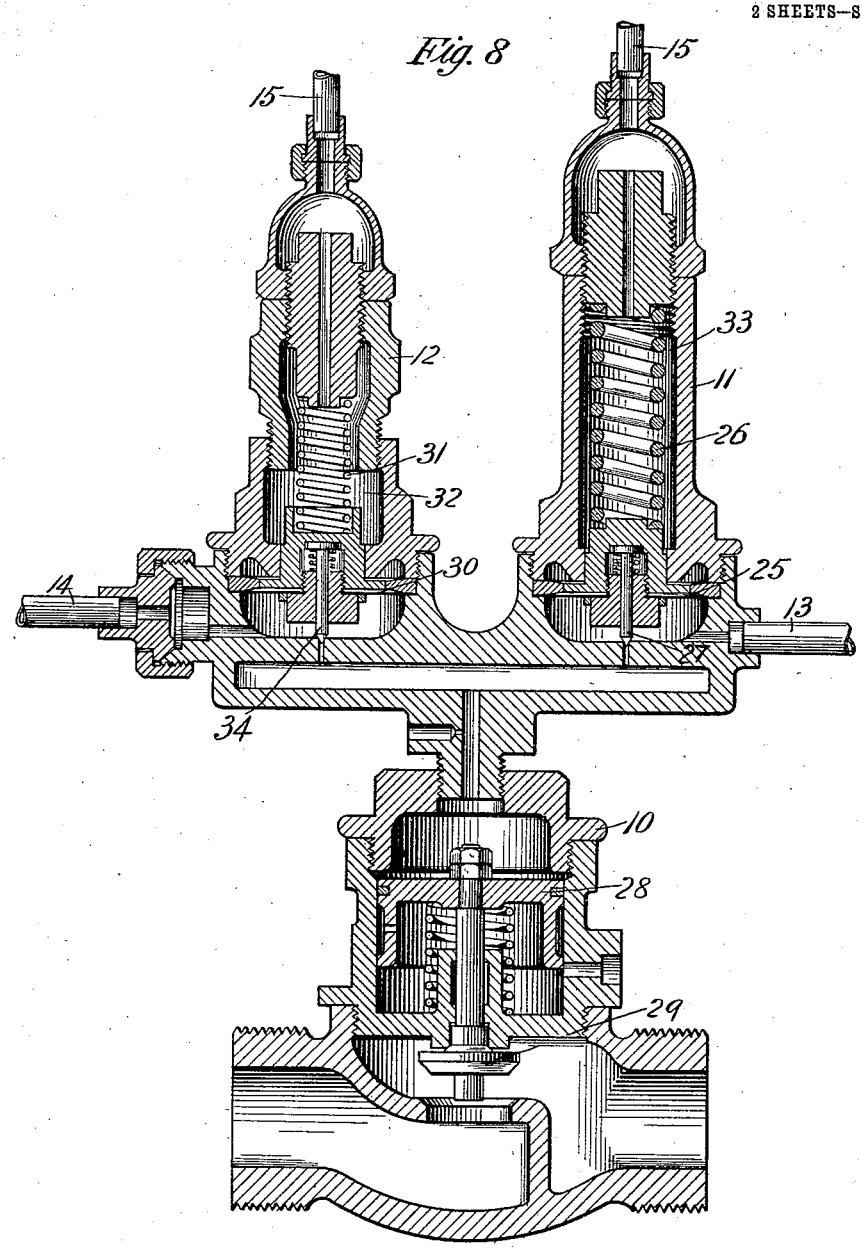
WITNESSES
INVENTOR
Walter V. Turner
by E. A. Wright
Att'y.

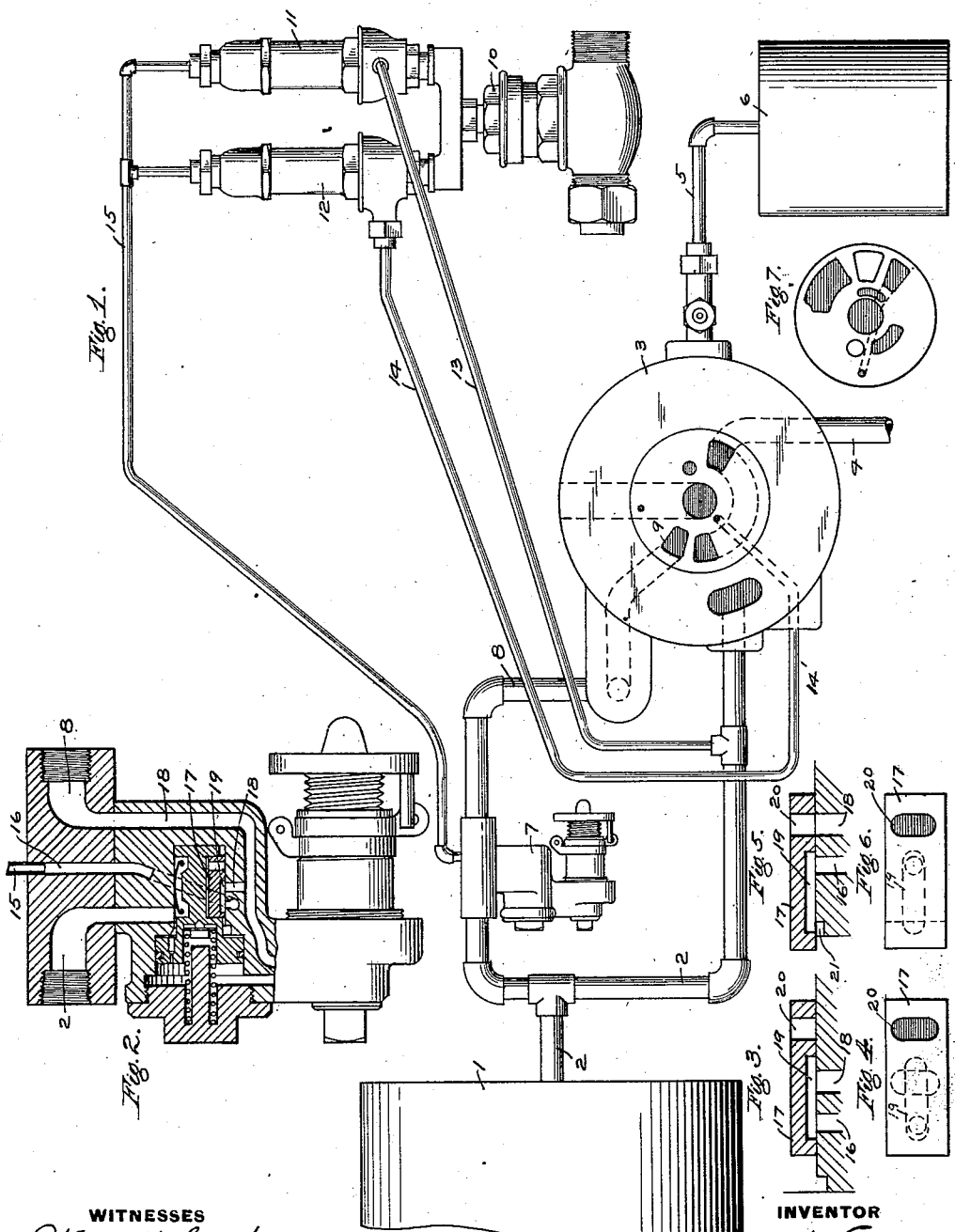

UNITED STATES PATENT OFFICE.

WALTER V. TURNER, OF EDGEWOOD, PENNSYLVANIA, ASSIGNOR TO THE WESTINGHOUSE AIR BRAKE COMPANY, OF PITTSBURGH, PENNSYLVANIA, A CORPORATION OF PENNSYLVANIA.

DUPLEX PRESSURE-CONTROL APPARATUS.

1,015,855.      Specification of Letters Patent.      Patented Jan. 30, 1912.

Application filed May 28, 1907. Serial No. 376,166.

*To all whom it may concern:*

Be it known that I, WALTER V. TURNER, a citizen of the United States, residing at Edgewood, in the county of Allegheny and State of Pennsylvania, have invented new and useful Improvements in Duplex Pressure-Control Apparatus, of which the following is a specification.

This invention relates to fluid pressure brakes, and more particularly to duplex pressure control apparatus.

In my Patent No. 874,260, granted December 17, 1907, a fluid pressure governing apparatus is shown and described, wherein the regulating spring load of the pressure governor for the air pump is augmented by a fluid pressure load, the degree of which is dependent on the particular maximum degree of train pipe pressure for which the duplex feed valve mechanism may be adjusted, so that the pressure governor is automatically adjusted to, and the main reservoir pressure consequently corresponds with, the desired maximum degree of train pipe pressure. For accomplishing this purpose, the spring chamber side of the pressure head diaphragm is subjected to the pressure of fluid at train pipe pressure as it flows from the duplex feed valve mechanism to the brake valve. Ordinarily, with this prior apparatus, when the train pipe pressure is very low, or has been excessively reduced, as by making an emergency application of the brakes, in order to restore the train pipe pressure, the brake valve is moved to full release position, in which the pressure governor is subjected to fluid pressure corresponding with the normal train pipe pressure, so that the pressure governor is automatically adjusted to cause the pump to compress air at the corresponding maximum degree of main reservoir pressure. If, however, the engineer should move the brake valve handle to running position, instead of full release position, the pressure governor head is subjected to the reduced pressure in the train pipe which may then be so low as to cause the governor to cut off steam from and thereby stop the pump before the desired maximum main reservoir pressure has been obtained.

The principal object of my invention is therefore to provide means adapted to automatically maintain the fluid pressure load on the pressure governor head in case the train pipe pressure is low or has been excessively reduced.

In the accompanying drawings, Figure 1 is a diagrammatic view, showing in elevation a standard engine brake equipment with my improvement applied thereto, the engineer's brake valve being shown in plan view; Fig. 2 an elevational view of the feed valve mechanism, partly in section, showing the arrangement of ports for controlling the fluid pressure to the pressure heads of the pressure governors; Fig. 3 an enlarged sectional view of the slide valve portion of the feed valve showing the ports in position to admit fluid at train pipe pressure to the pressure heads; Fig. 4 a plan view of the slide valve shown in Fig. 3; Fig. 5 a view similar to Fig. 3, showing the ports in position to admit fluid at main reservoir pressure to the pressure heads; Fig. 6 a plan view of the slide valve with the parts in the same position as shown in Fig. 5; Fig. 7 a face view of the rotary valve of the engineer's brake valve, showing the arrangement of ports and cavities; and Fig. 8 a central sectional view of the duplex pressure governor employed.

According to the construction shown in Fig. 1, the main reservoir 1 is connected by pipe 2 with the engineer's brake valve 3, said brake valve being also connected with the usual train pipe 4, and by a pipe 5 with the equalizing reservoir 6. A duplex feed valve mechanism 7 is interposed between the main reservoir pipe 2 and a pipe 8 leading to a port 9 in the rotary valve seat of the engineer's brake valve 3. The above apparatus and connections preferably being similar to that employed in connection with the well known standard Westinghouse ET equipment.

As shown in Fig. 8 of the drawings, the duplex pressure governor 10 may comprise a high pressure head 11 having a diaphragm 25 subject on one side to the pressure of an adjustable spring 26 and on the opposite side to fluid at main reservoir pressure supplied through pipe 13 which communicates with pipe 2 leading to the main reservoir 1. The diaphragm 25 is adapted to operate a valve 27 for controlling the admission of fluid under pressure to one side of a piston 28 which operates a steam throttle valve 29 of the pump. The pressure governor is also provided with a low pressure head 12 having a diaphragm 30 for controlling valve 34 and subject on one side to the pressure of an adjustable spring 31 and on the opposite side to fluid pressure supplied through pipe 14, which leads to a port in the rotary valve seat of the engineer's brake valve 3. The spring chamber 32 of the low pressure head 12 is connected to pipe 15, which communicates with a passage 16 leading to the slide valve seat of the feed valve device 7. If desired, the pipe 15 may also open into the spring chamber 33 of the high pressure head 11, in which case the spring 26 may be a lighter spring, as the fluid pressure admitted to the spring chamber 33 acts as part of the load on the diaphragm 25.

In my present construction, the spring side of the low pressure diaphragm is connected by a pipe 15 to a passage 16 in the feed valve casing, leading to the seat of the slide valve 17 of the feed valve mechanism, so that the fluid supply to said governor head is controlled by said slide valve.

When the fluid pressure in the feed passage 18 is at the normal degree for which the feed valve is adjusted, the slide valve 17 remains in its inner position with the feed port closed. In this position, a cavity 19 in the valve, connects passage 18 with passage 16 which opens into pipe 15, and consequently fluid from the feed passage 18 is supplied to the pipe 15 and thence to the spring chamber 32 of the low pressure head 12, so that the diaphragm 30 therein is then subject to fluid at the degree of pressure as determined by the adjustment of the feed valve mechanism. The train pipe pressure having been reduced in making an application of the brakes in the usual manner, if the brake valve is turned to running position, the feed passage 18 will be connected to the train pipe and the pressure in the feed passage 18 reduces by flow to the train pipe. The reduced pressure then causes the feed valve device to operate in the usual manner, the slide valve 17 moving to the position in which communication is opened for supplying fluid from the main reservoir to the passage 18 and the train pipe. In the construction shown in my previously mentioned patent, the low pressure head of the governor would, under these conditions, still be open to train pipe pressure, which, if sufficiently low, might cause the governor to cut out the pump at a much lower pressure than desired. In my present construction, when the slide valve 17 is shifted to its feed position, the cavity 19 connects the passage 16, through a recess 21 in the slide valve seat, with the valve chamber of the feed valve device, as shown in Fig. 5, so that fluid at main reservoir pressure is supplied to the pressure heads of the governor. The spring chamber 32 of the low pressure head 12 is thus supplied with fluid at main reservoir pressure and this pressure, together with the pressure of the adjustable spring 31 renders the main reservoir pressure acting on the opposite side of the diaphragm 30 ineffective to open the valve 34, whatever the degree of main reservoir pressure, so that the steam valve 29 is maintained wide open to supply the full head of steam to the pump, thereby causing the latter to operate with full force to rapidly build up the pressure in the main reservoir. It is thus apparent, that by the automatic operation of the train pipe feed valve mechanism, the fluid pressure load on the pressure governor heads will be maintained, regardless of any reduction in train pipe pressure.

Having now described my invention, what I claim as new, and desire to secure by Letters Patent is:—

1. In a fluid pressure brake, the combination with a main reservoir, a pressure governor therefor, and a train pipe, of means operating normally according to the degree of train pipe pressure for automatically adjusting the pressure governor to operate at a corresponding relative degree of pressure, and means operated by train pipe pressure for subjecting said pressure governor to a higher degree of pressure than that in the train pipe.

2. In a fluid pressure brake, the combination with a main reservoir, engineer's brake valve, and train pipe, of a pressure governor having a diaphragm subject on one side to main reservoir pressure, and means for admitting fluid at main reservoir pressure to the opposite side of said diaphragm.

3. In a fluid pressure brake, the combination with a main reservoir, engineer's brake valve, and train pipe of a pressure governor having a diaphragm normally subject on one side to main reservoir pressure, and means adapted to admit fluid, varying with train pipe pressure, at one time, and fluid from another source, at another time, to the opposite side of said diaphragm.

4. In a fluid pressure brake, the combination with a main reservoir, engineer's brake valve, and train pipe, of a pressure governor having a diaphragm subject on one side to main reservoir pressure, and means adapted to admit fluid at train pipe pressure, at one time, and fluid at main reservoir pressure, at another time, to the opposite side of said diaphragm.

5. In a fluid pressure brake, the combination with a main reservoir, engineer's brake valve, and train pipe, of a pressure governor having a diaphragm subject on one side to main reservoir pressure, and means governed by the degree of train pipe pressure for admitting fluid at train pipe pressure to the opposite side of said diaphragm, and adapted, when the train pipe pressure is reduced to admit fluid thereto at a higher degree of pressure than that in the train pipe.

6. In a fluid pressure brake, the combination with a main reservoir, engineer's brake valve, and train pipe, of a pressure governor having a diaphragm subject on one side to main reservoir pressure, and means controlled by train pipe pressure for admitting fluid at train pipe pressure at one time, and at main reservoir pressure at another time, to the opposite side of said diaphragm.

7. In a fluid pressure brake, the combination with a main reservoir, engineer's brake valve, and train pipe, of a pressure governor having a diaphragm subject on one side to main reservoir pressure, a load device acting on the opposite side of said diaphragm, and means for admitting fluid at train pipe pressure and at main reservoir pressure to said opposite side of the diaphragm at different times.

8. In a fluid pressure brake, the combination with a main reservoir, engineer's brake valve, and train pipe, of a pressure governor having a diaphragm subject on one side to main reservoir pressure, a load device acting on the opposite side of said diaphragm, and means for admitting fluid at train pipe pressure to said opposite side of the diaphragm, and operated on a reduction in train pipe pressure to admit fluid at main reservoir pressure thereto.

9. In a fluid pressure brake, the combination with a main reservoir, engineer's brake valve, and train pipe, of a pressure governor having a diaphragm subject on one side to main reservoir pressure, and an adjustable feed valve mechanism for regulating the normal degree of train pipe pressure, and adapted to control the admission of fluid under pressure to the opposite side of said diaphragm.

10. In a fluid pressure brake, the combination with a main reservoir, engineer's brake valve, and train pipe, of a pressure governor having a diaphragm subject on one side to main reservoir pressure, and an adjustable feed valve mechanism for regulating the normal degree of train pipe pressure, and adapted in one position to admit fluid at train pipe pressure and in another position, fluid at main reservoir pressure to the opposite side of said diaphragm.

11. In a fluid pressure brake, the combination with a main reservoir, engineer's brake valve, and train pipe, of a pressure governor having a diaphragm subject on one side to main reservoir pressure, and an adjustable feed valve mechanism for regulating the normal degree of train pipe pressure and adapted to admit fluid at train pipe pressure to the opposite side of said diaphragm in one position thereof, and to admit fluid at a higher pressure in another position.

12. In a fluid pressure brake, the combination with a main reservoir, engineer's brake valve, and a train pipe, of a duplex pressure governor having two diaphragms subject on one side to main reservoir pressure, load devices acting on the other side of said diaphragms, and means for admitting fluid at main reservoir pressure to the loaded side of said diaphragms.

13. In a fluid pressure brake, the combination with a main reservoir, engineer's brake valve, and a train pipe, of a duplex pressure governor having two diaphragms subject on one side to main reservoir pressure, load devices acting on the other side of said diaphragms, and means operated by train pipe pressure for controlling the admission of fluid at train pipe pressure, at one time, and fluid at main reservoir pressure at another time, to the loaded side of one of said diaphragms.

14. In a fluid pressure brake, the combination with a main reservoir, engineer's brake valve, and a train pipe, of a duplex pressure governor having two diaphragms subject on one side to main reservoir pressure, load devices acting on the other side of said diaphragms, and an adjustable feed valve mechanism for regulating the normal degree of train pipe pressure and adapted to admit fluid at train pipe pressure to the loaded side of one of said diaphragms, in one position, and fluid at main reservoir pressure, in another position thereof.

15. In a fluid pressure brake, the combination with a main reservoir, and a pressure governor therefor having a diaphragm subject on one side to main reservoir pressure, of means for controlling the admission of fluid at main reservoir pressure to the opposite side of said diaphragm.

16. In a fluid pressure brake the combination with a main reservoir, a pressure governor for regulating the degree of pressure in the main reservoir, and a train pipe, of means operating according to the degree of train pipe pressure for automatically adjusting the governor and a valve device for supplying fluid from another source to said means.

In testimony whereof I have hereunto set my hand.

WALTER V. TURNER.

Witnesses:
R. F. EMERY,
WM. M. CADY.

---

Copies of this patent may be obtained for five cents each, by addressing the "Commissioner of Patents, Washington, D. C."